(12) United States Patent
Gaulard

(10) Patent No.: US 7,145,105 B2
(45) Date of Patent: Dec. 5, 2006

(54) ELECTRIC KETTLE

(75) Inventor: Hervé Gaulard, Courtefontaine (FR)

(73) Assignee: SEB SA, Ecully ( * ) Notice: Subject to any disclaimer, the term of this patent is extended or adjusted under 35 U.S.C. 154(b) by 0 days.

(21) Appl. No.: 10/520,857

(22) PCT Filed: Jul. 9, 2003

(86) PCT No.: PCT/FR03/02146

§ 371 (c)(1),
(2), (4) Date: Aug. 5, 2005

(87) PCT Pub. No.: WO2004/006738

PCT Pub. Date: Jan. 22, 2004

(65) Prior Publication Data

US 2006/0096974 A1    May 11, 2006

(30) Foreign Application Priority Data

Jul. 10, 2002   (FR) .................................. 02 08688

(51) Int. Cl.
*A47J 27/21* (2006.01)
(52) U.S. Cl. ....................... 219/435; 219/432; 99/323.3
(58) Field of Classification Search ...................... None
See application file for complete search history.

(56) References Cited

U.S. PATENT DOCUMENTS 4,812,623 A * 3/1989 Haden et al. ................ 219/437
4,982,654 A * 1/1991 Bourgeois .................... 219/435
5,957,723 A * 9/1999 Gort-Barten ................. 439/568

FOREIGN PATENT DOCUMENTS

| DE | 19860931 A1 | * | 7/2000 |
|----|-------------|---|--------|
| EP | 303886 A | * | 2/1989 |
| EP | 0 895 742 | | 2/1999 |
| EP | 0930036 A1 | * | 7/1999 |
| GB | 2283162 A | * | 5/1995 |
| GB | 2 299 497 | | 10/1996 |
| GB | 2313768 A | * | 12/1997 |

* cited by examiner

*Primary Examiner*—Joseph Pelham
(74) *Attorney, Agent, or Firm*—Fish & Richardson P.C.; Richard P. Gilly

(57) ABSTRACT

The invention concerns an electric kettle comprising a power supply base (1) including electrical connection means (3), and, a removable container (2) including a reservoir (4), a electrical heating element (5), matching electrical connection means (8) adapted to co-operate with the electrical connection means (3) of the base (1), and control means (9) adapted to interrupt electric power supply of the electrical heating element (5) and which comprise a switch mobile between an open position and a closed position. The invention is characterized in that the power supply base (1) comprises a manual control knob (11) mobile between a neutral position and an activating position, and the kettle comprises transmission means (12) adapted to shift the switch in closed position when the manual control knob (11) is placed in activating position.

17 Claims, 4 Drawing Sheets

ELECTRIC KETTLE

TECHNICAL FIELD

This invention relates to a so-called cordless electric kettle comprising a power supply base and a removable receptacle suitable for being electrically connected to the base.

BACKGROUND

A cordless kettle of which the power supply base comprises electrical connection means suitable for being connected to an external electrical source, and, of which the receptacle comprises a container suitable for containing the liquid to be heated, an electrical heating device suitable for heating the liquid in the container, complementary electrical connection means that are suitable, when the receptacle is placed on the power supply base, for cooperating with the electrical connection means and supplying electrical power to the heating device, and control means suitable for controlling the electrical power supply of the electrical heating device, and that include a switch movable between an open position and a closed position, is known.

In such a kettle, the assembly providing electric power to the heating device and the control of said electrical power is arranged between the power supply base and the receptacle, and the control means are arranged on the receptacle.

SUMMARY

In such a kettle, the manual control button is arranged in close proximity to either the upper or lower end of the receptacle handle. Regardless of the position of the manual control button, its presence detracts from the appearance of the receptacle, which is, however, the part of the kettle seen by users, with the power supply base remaining in the kitchen. Moreover, when the control button is located at the lower end of the handle, it is difficult to reach when the receptacle is placed on the base. And when the button is located at the upper end of the handle, a complex mechanism is necessary to transmit the movement of the manual control button to the on switch located near the heating means.

Furthermore, some kettles of the aforementioned type allow for an electrical connection between the receptacle and the power supply base regardless of the angular position in the horizontal plane of the receptacle on the base. In such a kettle, the manual control button may be even less accessible when it makes an angle close to 180° with the side of the base accessible to the user. Therefore, although in such a kettle the receptacle can be placed in any angular position on the base, it is preferable to have it in a position in which the manual control button is accessible.

The problem is that of providing a kettle in which the manual control button does not detract from the appearance of the receptacle, and which is easily accessible regardless of the angular position of the receptacle on the base when the kettle allows for an electrical connection over 360° around the vertical axis.

According to the invention, the power supply base includes a manual control button movable between a resting position and an activation position, and the kettle includes transmission means that are suitable, when the receptacle is placed on the base, for moving the switch from its open position to its closed position when the manual control button is shifted from its resting position to its activation position.

According to a specific embodiment of the invention, when the electrical connection means of the power supply base and the complementary electrical connection means of the receptacle are in contact, the transmission means are suitable for moving the switch to the closed position when the manual control button is put in activation position.

According to a different embodiment, the transmission means are designed so that the switch is in closed position when the manual control button is put in activation position, regardless of the angular position of the receptacle on the power supply base.

Other distinctive features and advantages appear in the light of the following.

In the appended drawings, given by way of non-limiting example:

DETAILED DESCRIPTION

Figure 1:
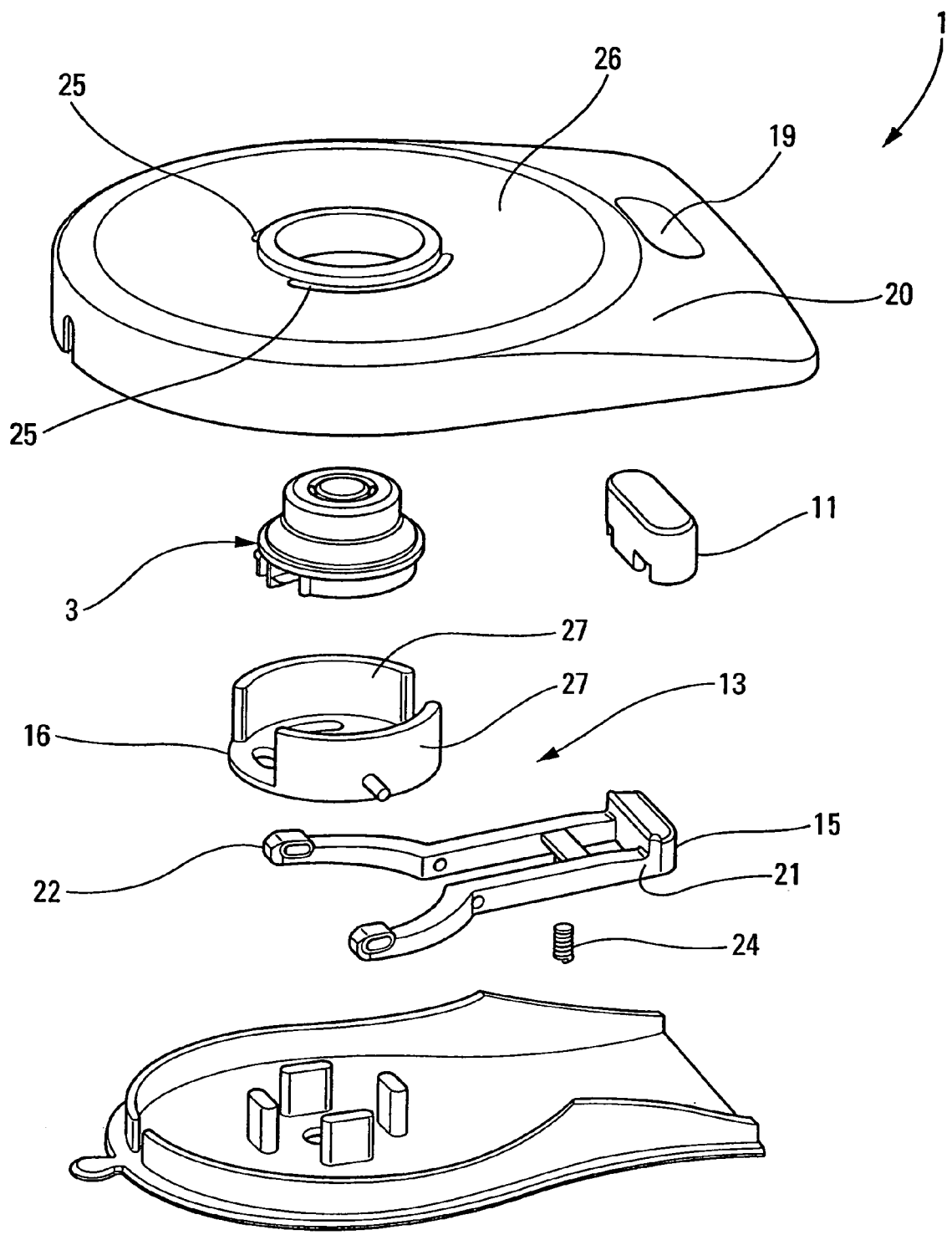
FIG. 1 is an exploded perspective view of the power supply base of the electric kettle according to the invention.

An electric kettle includes a power supply base 1 and a receptacle 2 removable from the power supply base 1 suitable for being electrically connected to the power supply base 1.

The power supply base 1 comprises electrical connection means 3 suitable for being connected to an external electrical source by means of a conventional electric plug.

The receptacle 2 comprises a container 4 suitable for containing the liquid to be heated.

The receptacle 2 also comprises an electrical heating device 5 suitable for heating the liquid in the container 4. In the example shown in FIG. 2, the heating device 5 includes an electrical resistor 6 connected to the base wall 7 of the container 4 which thus constitutes a heating wall.

The receptacle 2 also comprises complementary electrical connection means 8 suitable, when the receptacle 2 is placed on the power supply base 1, for cooperating with the electrical connection means 3 and supplying electrical power to the heating device 5. In the present example, electrical connection means 3 and complementary electrical connection means 8 are suitable for establishing the electrical connection regardless of the angular position of the receptacle 2 on the power supply base 1, with the conductors (phase, neutral and ground) being arranged concentrically (see FIG. 1).

In addition, the receptacle 2 comprises control means 9, suitable for controlling the electrical power supply of the electrical heating device 5. In the present example, these control means 9 are integral with the complementary electrical connection means 8 and constitute an electrical system known to those skilled in the art. The control means 9 conventionally include a first bimetal strip which is connected to a heat sensor and which enables the electrical power supply to be cut if the heating device 5 becomes overheated (for example, due to operation while dry), a second bimetal strip which is connected to a thermostat sensitive to a predetermined temperature of the vapor carried by a vapor channel 10, and which enables the electrical power supply to be cut when the liquid to be heated reaches the predetermined temperature, and a bistable switch movable between an open position and a closed position, which is suitable for being manually controlled, enabling the heating of the liquid to be started and stopped voluntarily, and which shifts from its closed position to its open position when complementary electrical connection means 8 are disconnected from electrical connection means 3.

According to the invention, the power supply 1 includes a manual control button 11 movable between a resting position and an activation position.

The kettle includes transmission means 12 which are suitable for putting the switch in the closed position when the manual control button 11 is put in activation position, with the receptacle 2 of course being connected to the power supply base 1 by bringing the electrical connection means 3 of the power supply base 1 into contact with the complementary electrical connection means 8 of the receptacle 2.

The transmission means 12 include transmission elements 13 which are housed in the power supply base 1, and complementary transmission elements 14 which are housed in the receptacle 2.

The transmission elements 13 are movable between a resting position in which the manual control button 11 is in resting position, and an activation position in which the manual control button 11 is in activation position. The complementary transmission elements 14 are movable between a resting position, and an activation position in which transmission elements 13 are in the activation position and the switch is in the closed position, with the receptacle 2 being connected to the power supply base 1.

Figure 2:
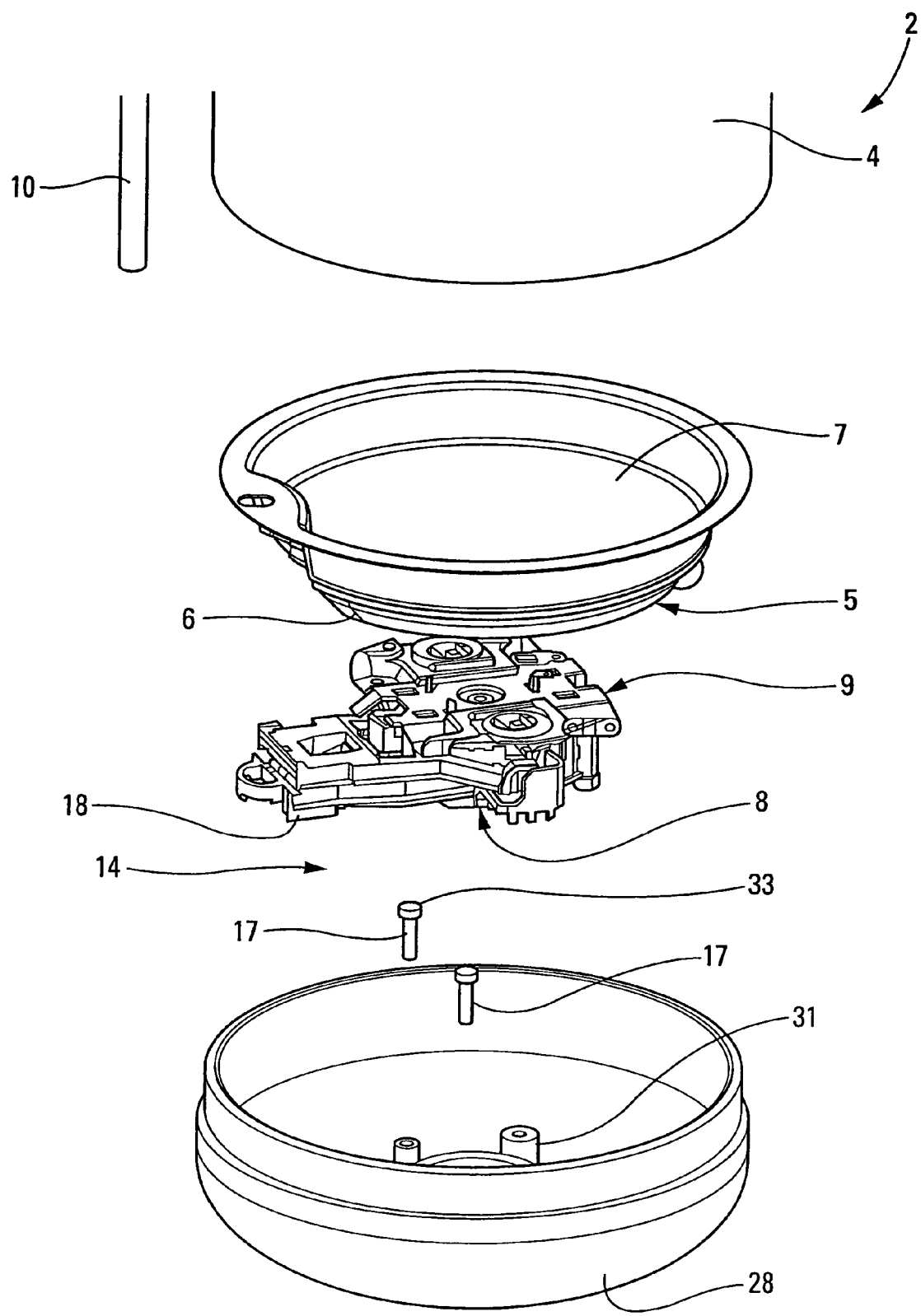
FIG. 2 is an exploded perspective view of the receptacle of the electric kettle according to the invention.
Figure 3:
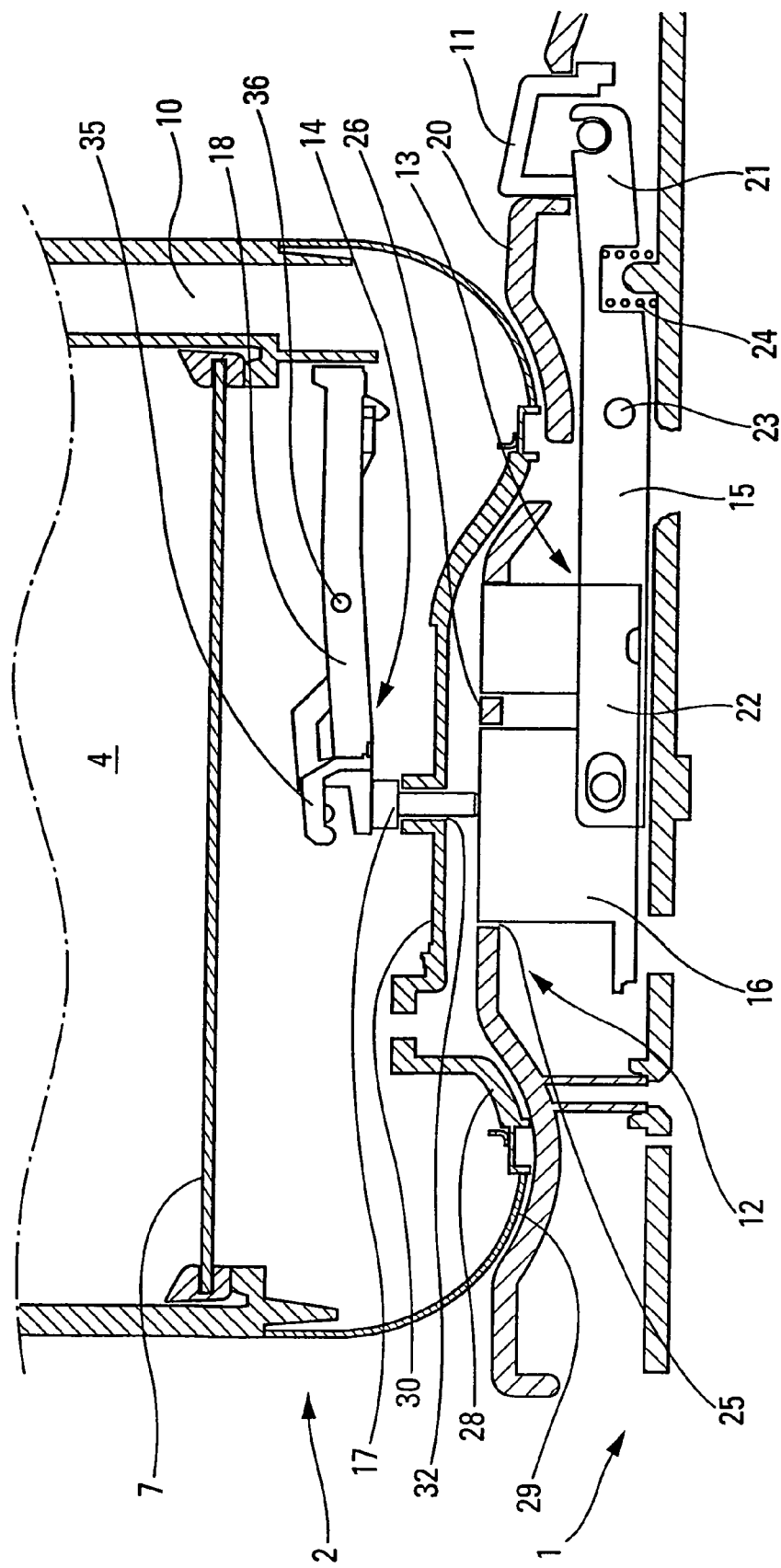
FIG. 3 is a cross-sectional view of the kettle, with the manual control button in resting position, and the electrical system of the kettle not being shown.
Figure 4:
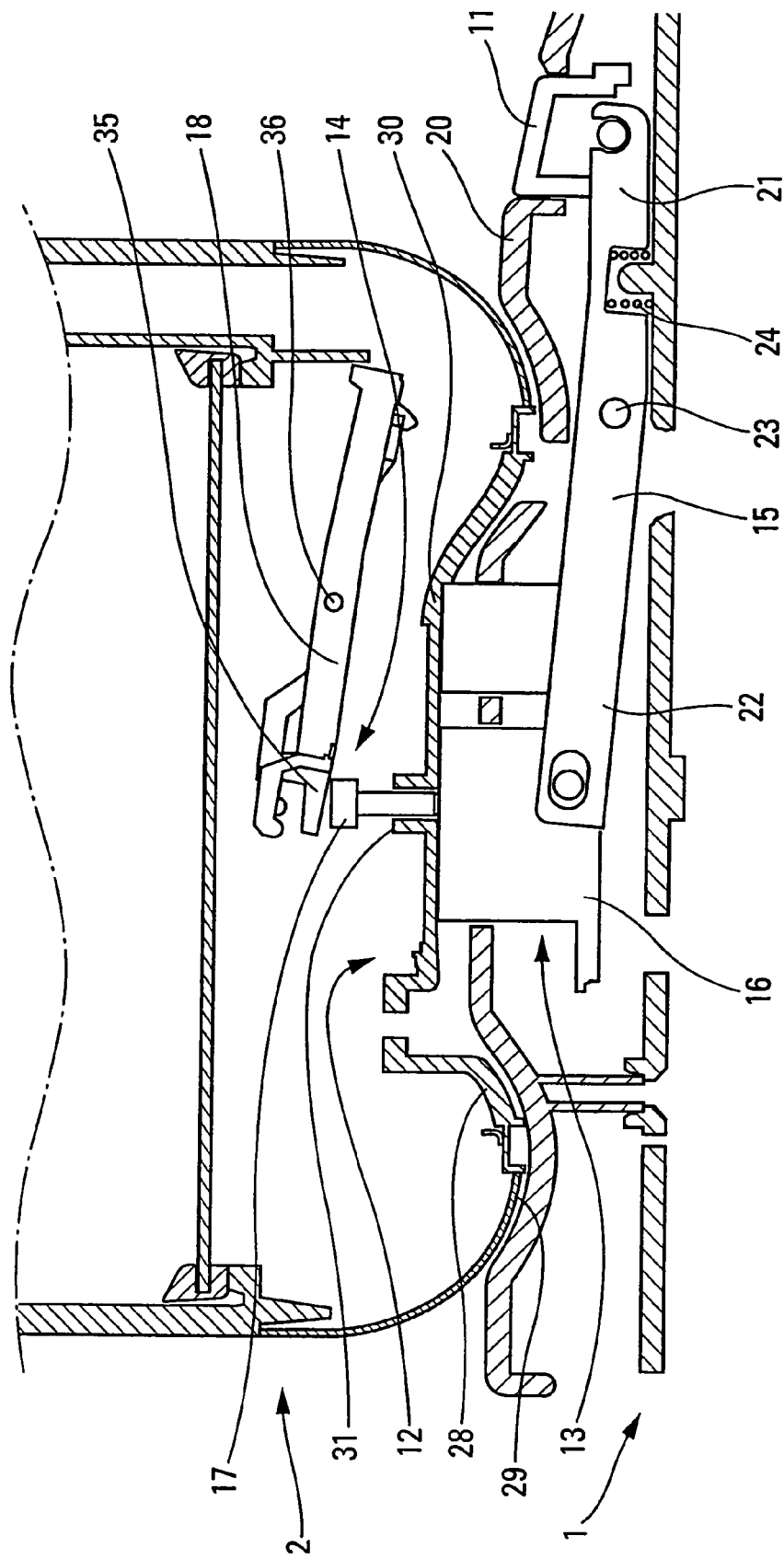
FIG. 4 is a view similar to that of FIG. 3, with the manual control button in activation position.

As shown in FIGS. 1, 3 and 4, the transmission elements 13 include a lever 15 pivotably mounted about a pivot pin 23, and a slidably-mounted plunger 16. Similarly, as shown in FIGS. 2, 3 and 4, the complementary transmission elements 14 include two slidably-mounted sliding elements 17, and an arm 18 mounted so as to pivot about a rotation pin 36 and be assembled with the switch (and therefore the control means 9).

The manual control button 11 is slidably mounted in a housing 19 that opens into an upper surface area 20 of the power supply base 1. Therefore, the manual control button 11 is accessible regardless of the angular position of the receptacle 2, and does not detract from the appearance thereof.

The lever 15 has a first end 21 to which the manual control button 11 is pivotably attached, thereby enabling the latter to move easily into the housing 19. The lever 15 has a second end 22 to which the plunger 16 is pivotably attached. The lever 15 and the plunger 16 are movable between a resting position in which the manual control button 11 is in the resting position, and an activation position in which the manual control button 11 is in the activation position. In the present example, a spring 24 constantly urges the lever 15, the manual control button 11 and the plunger 16 into their respective resting positions.

As shown in FIG. 1, the receiving wall 26 on which the receptacle 2 rests when it is connected to the power supply base 1 comprises two arc-shaped openings 25. The plunger 16 is designed so that its upper portion can pass through the openings 25 so as to project outside the receiving wall 26 when it is in its activation position (see FIG. 4).

In the present example, the transmission means 12 are designed so as to shift the switch into closed position when the manual control button 11 is put in the activation position, regardless of the angular position of the receptacle 2 on the power supply base 1. Consequently, in this example, the openings 25 are arranged co-axially and radially outside the electrical connection means 3, and, therefore, must be separated from one another by a large enough angle to enable the electrical connection means 3 to be integral with the receiving wall 26. Here, the two openings 25 are separated by around 60° and each extend along an angular sector close to 120°.

The plunger 16 has a general hollow cylinder shape suitable for sliding about the electrical connection means 3 (see FIG. 1). It has two side walls 27 angularly separated from one another, with the upper end of each side wall 27 being suitable for passing through an opening 25.

To avoid any damage, when the plunger 16 is in the resting position, it does not project from the receiving wall 26 (see FIG. 3).

Clearly, the lever 15 is arranged so that the plunger 16 is located in the central area of the receiving wall 26 and so that, in activation position, said plunger projects sufficiently to urge the complementary transmission elements 14 into their contact position.

The receptacle 2 includes a base wall 28 that has an annular shoulder 29 projecting from the receptacle 2 in the axial direction, and a central recess 30. The annular. shoulder 29 rests directly on the receiving wall 26 of the power supply base 1.

Each sliding element 17 is slidably mounted, between a resting position and an activation position, in a guide 31 integral with the receptacle 2, with the lower end of the guide 31 opening into the central recess 30 and forming an orifice 32. Each sliding element 17 includes an upper end forming a collar 33 which is suitable for abutting the upper end of the guide 31 so as to define the resting position of the sliding element 17. Each sliding element 17 includes a lower end which is suitable for projecting from the orifice 32, and which is protected from any damage by the difference in elevation between the annular shoulder 29 and the central recess 30.

To make contact possible between the sliding elements 17 and the plunger 16, then to enable the latter to drive the former, the orifices 32 are at least partially facing at least one portion of the openings 25 when the receptacle 2 is connected to the power supply base 1.

In the present example, the transmission means 12 are designed so as to shift the switch into closed position when the manual control button 11 is put in activation position, regardless of the angular position of the receptacle 2 on the power supply base 1. Therefore, in this example, the orifices 32 are arranged radially outside the complementary electrical connection means 8, and are separated from one another so that there is always at least one orifice 32 facing at least one of the openings 25. Here, the two orifices 32 are separated from one another by around 90°.

When the receptacle 2 is placed on the power supply base, the lower portion of at least one sliding element 17 is located directly above the upper end of the plunger 16. When the manual control button 11 goes from its resting position to its activation position, it passes through a position in which the plunger 16 comes into contact with at least one sliding element, thus defining a contact position of the manual control button 11, the lever 15 and the plunger 16.

The plunger 16 can drive each sliding element 17 opposite it until the plunger 16 engages the orifice 32. The transmission means 12 are obviously arranged so that each sliding element 17 is in its activation position before the plunger 16 engages the receptacle 2.

The arm 18, attached to the bistable switch, has a free end 35 facing the collars 33 of all of the sliding elements 17.

When the manual control button 11 shifts from its resting position to its activation position, it passes through a position in which at least one sliding element 17, driven by the plunger 16, comes into contact with the free end 35 of the arm 18, thus defining a transmission position of the manual control button 11, the lever 15, the plunger 16 and the sliding elements 17.

Since the arm 18 is integral with the bistable switch, once the equilibrium position of the switch has been passed, the arm 18 moves into its activation position and the switch moves into its closed position. The transmission means 12 are obviously arranged so that the arm is in equilibrium position before the plunger 16 engages the receptacle 2.

The arm 18 is obviously arranged so that its free end 35 is located in the central area of the base wall 28, and so that it drives the switch into closed position before the plunger 16 engages the receptacle 2.

Thus, the kettle according to the present invention has the advantage of being capable of using control means, electrical connection means and complementary electrical connection means that are known and available, i.e. without using specially designed elements, thereby obviously reducing the production costs.

The present invention is obviously not limited to the embodiment corresponding to FIGS. 1 to 4. It is, for example, possible to have a kettle in which the receptacle can be placed in only one angular connection position on the power supply base.

It is also possible to have transmission means different from those described above. For example, it would be possible to have electrical connection means surrounding the transmission elements, and complementary electrical connection means surrounding the complementary transmission elements.

It would also be possible to have a single sliding element with a cylindrical shape equivalent to the shape of the plunger described with respect to the present figures, with the orifices being separated from one another by a angle large enough to enable the complementary electrical connection means to be secured to the base wall.

The number of openings and orifices can obviously be modified, while at least one orifice must be located opposite at least one opening when the receptacle is connected to the base.

The invention claimed is:

1. Electric kettle including a power supply base comprising electrical connection means suitable for being connected to an external electrical source, and a manual control button movable between a resting position and an activation position, and a receptacle, removable from the power supply base, comprising a container suitable for containing a liquid to be heated, an electrical heating device suitable for heating the liquid in the container, and complementary electrical connection means which are suitable, when the receptacle is placed on the power supply base, for cooperating with the electrical connection means and supplying electrical power to the heating device, characterized in that the receptacle includes control means suitable for cutting the electrical power supply to the electrical heating device and which include a switch that is movable between an open position and a closed position, wherein the kettle includes transmission means suitable, when the receptacle is placed on the base, for shifting the switch from its open position to its closed position when the manual control button is shifted from its resting position to its activation position.

2. Electric kettle according to claim 1, characterized in that, when the electrical connection means of the power supply base and the complementary electrical connection means of the receptacle are in contact, the transmission means are suitable for shifting the switch into the closed position when the manual control button is shifted to the activation position.

3. Kettle according to claim 1, characterized in that the transmission means include transmission elements housed in the power supply base, movable between a resting position and an activation position in which the manual control button is in the activation position, and complementary transmission elements housed in the receptacle, movable between a resting position and an activation position in which the transmission elements are in the activation position and the switch is in the closed position, with the receptacle being connected to the power supply base.

4. Kettle according to claim 3, characterized in that the transmission elements include a lever pivotably mounted with respect to the power supply base of which a first end is attached to the manual control button, and the second end is suitable for driving the complementary transmission elements towards their activation position.

5. Kettle according to claim 4, characterized in that the transmission elements include at least one plunger attached to the second end of the lever, slidably mounted in the power supply base, and suitable for passing through at least one opening provided in a receiving wall of the power supply base on which the receptacle is resting, for coming into contact with the complementary transmission elements and driving them into their activation position when the manual control button is in the activation position.

6. Kettle according to claim 3, characterized in that the complementary transmission elements include at least one sliding element slidably mounted in the receptacle and suitable for passing through at least one orifice provided in the base wall of the receptacle and for coming into contact with the transmission elements and driving the switch towards its closed position when the manual control button is in the activation position.

7. Kettle according to claim 6, characterized in that a pivoting arm is mounted integrally with the switch and is suitable for coming into contact with all of the sliding elements.

8. Kettle according to claim 6, characterized in that the base wall of the receptacle includes an annular shoulder projecting from the receptacle and suitable for resting on the power supply base, and a central recess in which all of the orifices are provided.

9. Kettle according to claim 1, characterized in that the manual control button is constantly urged towards its resting position by a spring.

10. Kettle according to claim 1, characterized in that the switch is bistable.

11. Kettle according to claim 1, characterized in that the transmission means are designed so as to shift the switch into closed position when the manual control button is in the activation position, regardless of the angular position of the receptacle on the power supply base.

12. Kettle according to claim 11, characterized in that the transmission means are cylindrically symmetrical and coaxial to the electrical connection means and to the complementary electrical connection means.

13. Kettle according to claim 12, wherein the transmission means include transmission elements housed in the power supply base, movable between a resting position and an activation position in which the manual control button is in the activation position, and complementary transmission elements housed in the receptacle, movable between a resting position and an activation position in which the transmission elements are in the activation position and the switch is in the closed position, with the receptacle being connected to the power supply base, wherein the transmission elements include a lever pivotably mounted with respect to the power supply base, of which a first end is attached to the manual control button, and the second end is suitable for driving the complementary transmission elements towards their activation position, wherein the transmission elements include at least one plunger attached to the second end of the lever, slidably mounted in the power supply base, and suitable for passing through at least one opening provided in a receiving wall of the power supply base on which the receptacle is resting, for coming into contact with the complementary transmission elements and driving them into their activation position when the manual control button is in the activation position, and wherein the complementary transmission elements include at least one sliding element slidably mounted in the receptacle and suitable for passing through at least one orifice provided in the base wall of the receptacle and for coming into contact with the transmission elements and driving the switch towards its closed position when the manual control button is in the activation position, characterized in that, the transmission means are radially arranged outside the electrical connection means and the complementary electrical connection means, wherein all of the arc-shaped openings and orifices are radially and angularly distributed so that, regardless of the angular position of the receptacle, at least one angular cross-section portion of an opening is opposite an orifice.

14. Kettle according to claim 13, characterized in that the plunger has a general hollow cylinder shape suitable for sliding around the electrical connection means, and of which the side walls have an upper end suitable for passing through all of the openings.

15. Kettle according to claim 14, characterized in that the power supply base includes two openings separated from one another by around 60°, and each extend according to an angular sector close to 120°.

16. Kettle according to claim 13, characterized in that the upper portion of each sliding element includes a collar suitable for abutting the upper end of the guide in which the sliding element slides, so as to determine the resting position of said sliding element.

17. Kettle according to claim 16, wherein the plunger has a general hollow cylinder shape suitable for sliding around the electrical connection means, and of which the side walls have an upper end suitable for passing through all of the openings, and wherein the power supply base includes two openings separated from one another by around 60°, and each extend according to an angular sector close to 120°, characterized in that the two sliding elements are separated from one another by an angle of about 90°.

* * * * *